US012627684B2

(12) United States Patent
 Lukiyan et al.

(10) Patent No.: US 12,627,684 B2
(45) **Date of Patent: *May 12, 2026**

(54) SYSTEM AND METHOD FOR SECURE TRANSFER OF DATA BETWEEN NETWORKS

(71) Applicant: AO Kaspersky Lab, Moscow (RU)

(72) Inventors: Dmitry S. Lukiyan, Moscow (RU); Alexey G. Vereshchagin, Moscow (RU); Maxim A. Dontsov, Moscow (RU); Ruslan Y. Morozov, Moscow (RU); Denis S. Kashitsyn, Moscow (RU)

(73) Assignee: AO Kaspersky Lab, Moscow (RU)

( * ) Notice: Subject to any disclaimer, the term of this patent is extended or adjusted under 35 U.S.C. 154(b) by 50 days.

This patent is subject to a terminal disclaimer.

(21) Appl. No.: 18/931,510

(22) Filed: Oct. 30, 2024

(65) Prior Publication Data

US 2025/0055861 A1     Feb. 13, 2025

Related U.S. Application Data

(63) Continuation of application No. 17/750,652, filed on May 23, 2022, now Pat. No. 12,166,771.

(30) Foreign Application Priority Data

Oct. 14, 2021    (RU) ........................... RU2021130011

(51) Int. Cl.
    *G06F 15/16*        (2006.01)
    *G06F 9/448*        (2018.01)
    *H04L 9/40*         (2022.01)

(52) U.S. Cl.
    CPC ........ *H04L 63/1416* (2013.01); *G06F 9/4498* (2018.02); *H04L 63/102* (2013.01); *H04L 63/1425* (2013.01); *H04L 63/20* (2013.01)

(58) Field of Classification Search
    CPC .............. H04L 63/1416; H04L 63/102; H04L 63/1425; H04L 63/20; G06F 9/4498
    See application file for complete search history.

(56) References Cited

U.S. PATENT DOCUMENTS 10,841,277  B2    11/2020  Park et al.
2008/0010461  A1*   1/2008  Holden ................. H04L 67/563
                                                713/168

(Continued)

*Primary Examiner* — Normin Abedin
(74) *Attorney, Agent, or Firm* — ArentFox Schiff LLP; Michael Fainberg

(57) ABSTRACT

Disclosed system and method for secure transfer of data between networks. An example method comprises: setting a first state of the gateway, wherein in the first state a destination agent of the gateway is granted access to a first memory and denied access to a second network; while the gateway is in the first state, configuring the destination agent, based on one or more parameters stored in the first memory, to transfer data received from a source agent of the gateway to the second network; changing the state of the gateway to a second state, wherein in the second state the destination agent is denied access to the first memory and granted access to the second network; and while the gateway is in the second state, controlling transfer of the data from the source agent of the first network to the destination agent of the second network.

20 Claims, 8 Drawing Sheets

(56) References Cited

U.S. PATENT DOCUMENTS

| | | | |
|---|---|---|---|
| 2010/0299742 A1* | 11/2010 | Declety | ............... H04L 63/0209 |
| | | | 726/13 |
| 2013/0268997 A1 | 10/2013 | Clancy et al. | |
| 2016/0379003 A1* | 12/2016 | Kapoor | ............... G06F 9/45558 |
| | | | 726/27 |
| 2019/0097972 A1 | 3/2019 | Coleman et al. | |
| 2019/0098007 A1* | 3/2019 | Coleman | ............. H04L 63/0876 |

* cited by examiner

410 Setting the gateway state to safe

420 Granting access to trusted memory at the request of the destination agent

430 Configuring the destination agent

440 Changing the gateway state to work

450 Transferring data from the first network to the second network via the source agent to the destination agent

SYSTEM AND METHOD FOR SECURE TRANSFER OF DATA BETWEEN NETWORKS

CROSS REFERENCE TO RELATED APPLICATIONS

The present application is a continuation of U.S. patent application Ser. No. 17/750,652 filed May 23, 2022, which claims benefit of priority to a Russian Application No. 2021130011 filed on Oct. 14, 2021, and which is incorporated by reference herein.

FIELD OF TECHNOLOGY

The present invention relates generally to the field of network communications and, more specifically, to a network gateway and a method for transferring data from a first network to a second network.

BACKGROUND

Currently, the application of digital services in the Industrial Internet of things (IIoT) is becoming more widespread. Such digital services are typically installed on a remote server and are typically intended for the processing and analysis of data received from devices (hardware) of an Information System (hereafter, IS) based on the Internet of Things (IoT). Data from IS devices, such as, for example, transducers and sensors, actuators, is transferred to the remote server via a network gateway.

It is the network gateway (hereafter, the gateway) that is responsible for ensuring a reliable and secure connection of the IS devices to the remote server. The IS devices communicate with the server through the gateway. In other words, the IS devices are located on an internal network with respect to the server. The server is located on an external network, and the communication between the server and the IS devices takes place through the gateway. Generally, the internal IS network should be protected from computer-based attacks from the external network. The remote server is, typically, the most vulnerable component because it is connected to an external network, such as the Internet. Thus, the remote server may be a subject to a whole range of computer attacks, including, but not limited to: MITC attacks (Man in the cloud); attacks that use bugs and vulnerabilities in the remote server code and architecture and the installed services; buffer overflow attacks; Structured Query Language (SQL) injection database attacks; elevation of privilege attacks; vulnerable channel attacks; Distributed Denial of Service (DDoS) attacks; data integrity violation attacks; certificate spoofing attacks; phishing attacks; password selection or password reset to obtain unauthorized access; social engineering attacks; attacks involving installation of malicious software (hereafter "SW"); attacks that exploit vulnerabilities; insecure application installation attacks, and the like. MITC attack is an attack based on the theft of unique tokens which are generated when a service is first used and which are stored on the user's machine for convenience. By running a computer attack on a remote server, an attacker could continue the attack on the gateway and gain access to the internal IS network. Getting access to the internal network, in turn could lead to unauthorized access to the IS device data and even put the IS devices and the IS itself out of action. It should be noted that an attack on a remote server can be carried out both externally and internally, for example, by physical access to the server.

Another type of a computer attack on the internal IS network is an attack on the communication channel between the gateway and the remote server, that is, on the external network. An attacker may carry out such an attack by, for example, searching for devices through open ports, searching for device vulnerabilities, hacking into the communication link, performing a man-in-the-middle attack, and by gaining unauthorized access to device applications.

A third type of a computer attack is a gateway attack, which may be accomplished by physically accessing the gateway or by using an external network in the event of a successful attack on a remote server or an external network.

Therefore, the technical problem arises involving a level of security of the devices connected to the first network (the internal network) against computer network attacks originating from the second network (the external network).

However, the known technology does not solve the stated technical problem, since duplicating network traffic into a hidden network for analysis does not fully protect an operational network from computer attacks from the Internet. Therefore, there is a need for increasing level of security of the devices connected to the internal network against computer network attacks originating from the external network.

SUMMARY

Disclosed are systems and methods for transferring data from a first network to a second network using a gateway.

Advantageously, the disclosed method performs a secure unidirectional data transfer from a first network to a second network.

Another advantage is an increase in a level of security of a trusted memory of a network gateway against computer network attacks by allowing access to the trusted memory, while the gateway is in a first ('safe') state and by denying access to the trusted memory while the gateway is in a second ('work') state.

In one aspect, a method for transferring data from a first network to a second network using a gateway, comprising: setting a first state of the gateway, wherein in the first state a destination agent of the gateway is granted access to a first memory and denied access to the second network; while the gateway is in the first state, configuring the destination agent, based on one or more parameters stored in the first memory, to transfer data received from a source agent of the gateway to the second network; changing the state of the gateway to a second state, wherein in the second state the destination agent is denied access to the first memory and granted access to the second network; and while the gateway is in the second state, controlling transfer of the data from the source agent of the first network to the destination agent of the second network.

In one aspect, the first memory comprises a trusted memory for storing data critical to secure operation of the gateway.

In one aspect, in the second state, data transfer from the source agent to the destination agent is permitted.

In one aspect, the data transfer is performed based on the one or more parameters of the destination agent stored in the first memory.

In one aspect, changing the state of the gateway to the second state further comprises changing the state of the gateway to the second state after configuration of the destination agent is complete.

In one aspect, the one or more parameters include one or more transmission authorization parameters.

In one aspect, the one or more parameters including a list of data to be transferred from the first network.

In one aspect, in the first state, the access is denied to the second memory, and in the second state the access is granted to the second memory.

In one aspect, the second memory comprises untrusted memory contains a buffer for storing the data to be transferred and destination agent information.

In one aspect, controlling transfer of the data further comprises controlling communications between one or more resources according to one or more security policies, wherein the one or more resources comprise the destination, the source agent, and the first memory.

In one aspect, the one or more security policies employ a finite state machine, where a state of the finite state machine represents a state of the gateway, and wherein the one or more security policies determine whether to allow or deny access from one gateway component to another gateway component depending on the state of the finite state machine.

In another aspect, a system for transferring data from a first network to a second network using a gateway, comprising: at least one memory; at least one hardware processor coupled with the at least one memory and configured, individually or in combination, to: set a first state of the gateway, wherein in the first state a destination agent of the gateway is granted access to a first memory and denied access to the second network; while the gateway is in the first state, configure the destination agent, based on one or more parameters stored in the first memory, to transfer data received from a source agent of the gateway to the second network; change the state of the gateway to a second state, wherein in the second state the destination agent is denied access to the first memory and granted access to the second network; and while the gateway is in the second state, control transfer of the data from the source agent of the first network to the destination agent of the second network.

In another aspect, a non-transitory computer readable medium storing computer executable instructions for transferring data from a first network to a second network using a gateway, including instructions for: setting a first state of the gateway, wherein in the first state a destination agent of the gateway is granted access to a first memory and denied access to the second network; while the gateway is in the first state, configuring the destination agent, based on one or more parameters stored in the first memory, to transfer data received from a source agent of the gateway to the second network; changing the state of the gateway to a second state, wherein in the second state the destination agent is denied access to the first memory and granted access to the second network; and while the gateway is in the second state, controlling transfer of the data from the source agent of the first network to the destination agent of the second network.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1A:
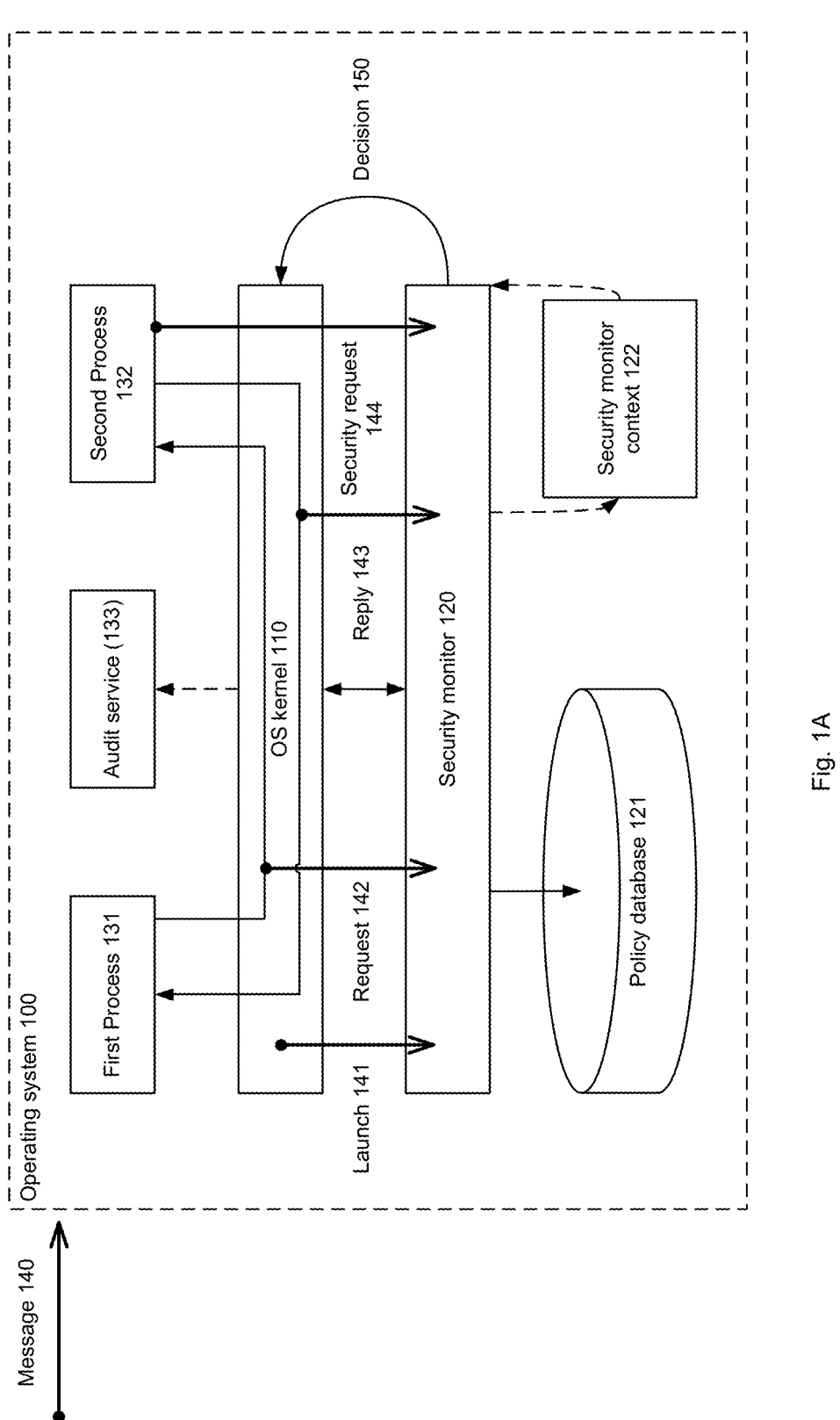
FIGS. 1A, 1B and 1C are example diagrams of Inter-Process Communication (IPC) communication using a security monitor based on an example of an operating system having a microkernel architecture.

Exemplary aspects are described herein in the context of a system, method, and computer program product for protecting subscriber data in the event of unwanted calls. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Glossary: A number of terms are defined herein which will be used to describe variant aspects of the present disclosure.

Process: a sequence of operations in the execution of a program or a part thereof together with the useful data, which may include one or more threads and associated system resources.

Inter-process communication (IPC): a set of methods for exchanging data between multiple threads in one or more processes. Processes may be launched on one or more computers that are connected to each other via the network. IPC methods may be divided into methods of exchanging messages, synchronization, shared memory, and remote procedure calls.

An operation is an elementary action performed within the process under consideration (a non-limiting example of an operation may be an API function call).

Modern operating systems may use both synchronous and asynchronous operations to pass data between two processes using IPC methods.

A finite state machine (FSM) is a model of a discrete device characterized by states and transitions from one state to another. Each state of the finite state machine characterizes one of the possible situations in which the finite state machine can be located.

The Internet of Things (IoT) is a computational network of physical objects ("things") equipped with built-in technologies for interaction with one another or with the external environment. The IoT may also include, but is not limited to technologies such as wearables, electronic vehicle systems, smart cars, smart cities, industrial systems, and the like.

The Industrial Internet of things (IIoT) consists of internet-connected equipment and advanced analytics platforms that process data obtained from connected devices. A wide range of IIoT devices exists, ranging from small weather sensors to sophisticated industrial robots.

A computer attack (also 'cyber attack') is a targeted impact on information systems and information and telecommunication networks by software-based means, carried out in order to breach the security of information in these systems and networks.

The network gateway of the local computer network (also, the gateway) is a device connecting the local computer network to another network.

Modern operating systems (hereafter, OS) are complex ISs with a large set of installed software for performing a wide variety of functions. At the same time, software developers are constantly working on bug corrections and are constantly expanding the functionality of the software. However, such quantity and range of software may carry significant information security risks due to vulnerabilities in the software and also due to the possibility of unauthorized installation of malicious software. The first layer of protection against these threats is the built-in security features of the OS architecture. The OS provides the mechanisms for processing and controlling IPC, which may be implemented, inter alia, by exchanging messages between processes.

Many popular operating systems (such as, but not limited to, Windows 9x, Linux, Android, and the like) may use a monolithic kernel. The monolithic kernel has a number of advantages, for example, the simplicity of communication between drivers, and performance. However, due to the large number of kernel software modules and, as a result of the high probability of errors in the code, it proves to be difficult to ensure the reliability and security of a monolithic OS. As a result, if a vulnerability exists in the OS, delivery of certain unwanted or malicious messages may still be allowed between processes by the features for IPC processing and control. An example of such a malicious message between processes is a message requesting access to a protected area of memory. Another type of OS is an OS having a microkernel (for example, KasperskyOS, Symbian, etc.). The micro kernel may provide a minimum set of elementary process control and abstraction functions for working with the hardware. The microkernel architecture of the OS may be characterized by the small size of the microkernel and the trusted computing platform. The microkernel architecture contributes to a higher level of reliability and security of the OS's microcore architecture, since it is easier to verify the correctness of a small amount of microkernel code. However, the microkernel architecture typically has lower performance. There are also operating systems with hybrid kernels (such as, but not limited to, MacOS X, Windows NT, and the like), which allow the operating system to take advantage of the well-structured microkernel architecture of the OS while maintaining the performance of the monolithic core.

Figure 1B:
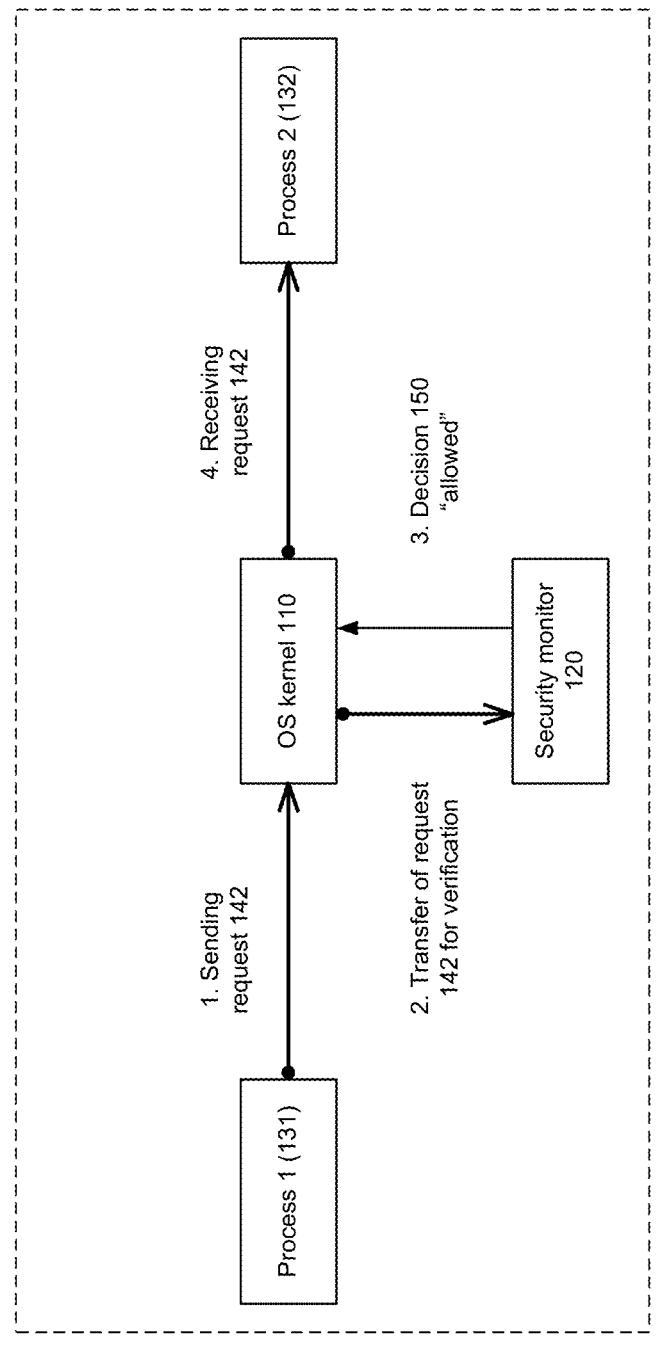
Figure 1C:
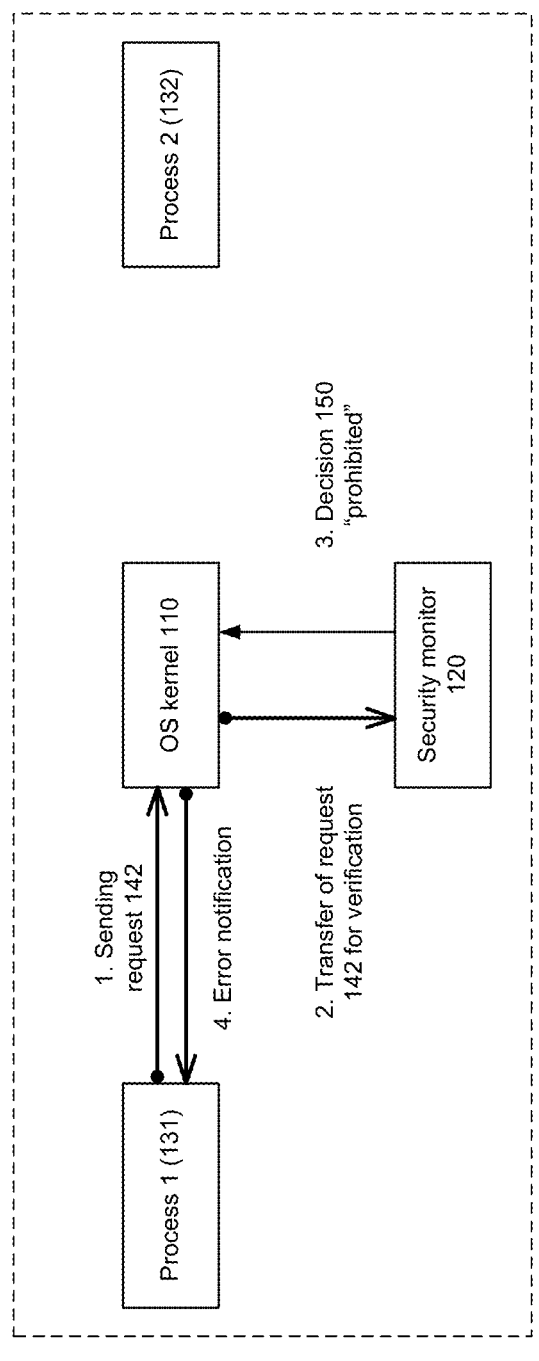

FIGS. 1A, 1B and 1C are example diagrams of IPC communication using a security monitor 120 based on an example of an operating system 100 having a microkernel architecture.

The OS 100 shown in FIG. 1a may include isolated processes 131-132 of applications of the OS 100 that may interact with one another through IPC. The processes 132-132 may also interact with the OS kernel 110 by means of programming interfaces through the exchange of messages 140 (also, IPC messages, indicated in FIGS. 1A-1B by a bold arrow starting with a dot). Messages 140 may include, but are not limited to the following: a request to launch 141 a process 131, request 142 from a process 131 or reply 143 from another process 132 (for example, calls to a method of a second process 132 by a first process 131), process request 132 to the security monitor 120 (security request 144). It should be noted that messages 140, as used herein, are understood to mean IPC messages, in general facilitating communication between various processes of the OS 100, including processes 131-132. The security monitor 120 may be a component of the OS 100 configured to control the delivery of the above-mentioned messages 140. Details of the implementation of the security monitor 120 will be disclosed below. The messages 140 may also include an error notification from the OS kernel 110 in response to the messages 140 from processes 131-132. In this case, the above-mentioned interfaces implemented by the processes may be data structures containing declared methods which implement the functionality of the corresponding process.

The aforementioned interfaces may be defined statically and the allowed communications between the processes may be defined in advance.

Messages 140 may be sent and received by processes 131-132 by means of system calls to the OS kernel 110.

System calls may include, but are not limited to the following:

Call( ): used by the first process 131 to send a request 142 to the second process 132 and receive a reply 143 from the second process 132 to perform IPC;

recv( ): used by the second process 132 in order to receive the request 142;

reply( ): used by the second process 132 to send the reply 143 to the first process 131.

In an aspect, the system call reply( ) may be carried out in the same process thread in which the call recv( ) was carried out.

Figure 5:
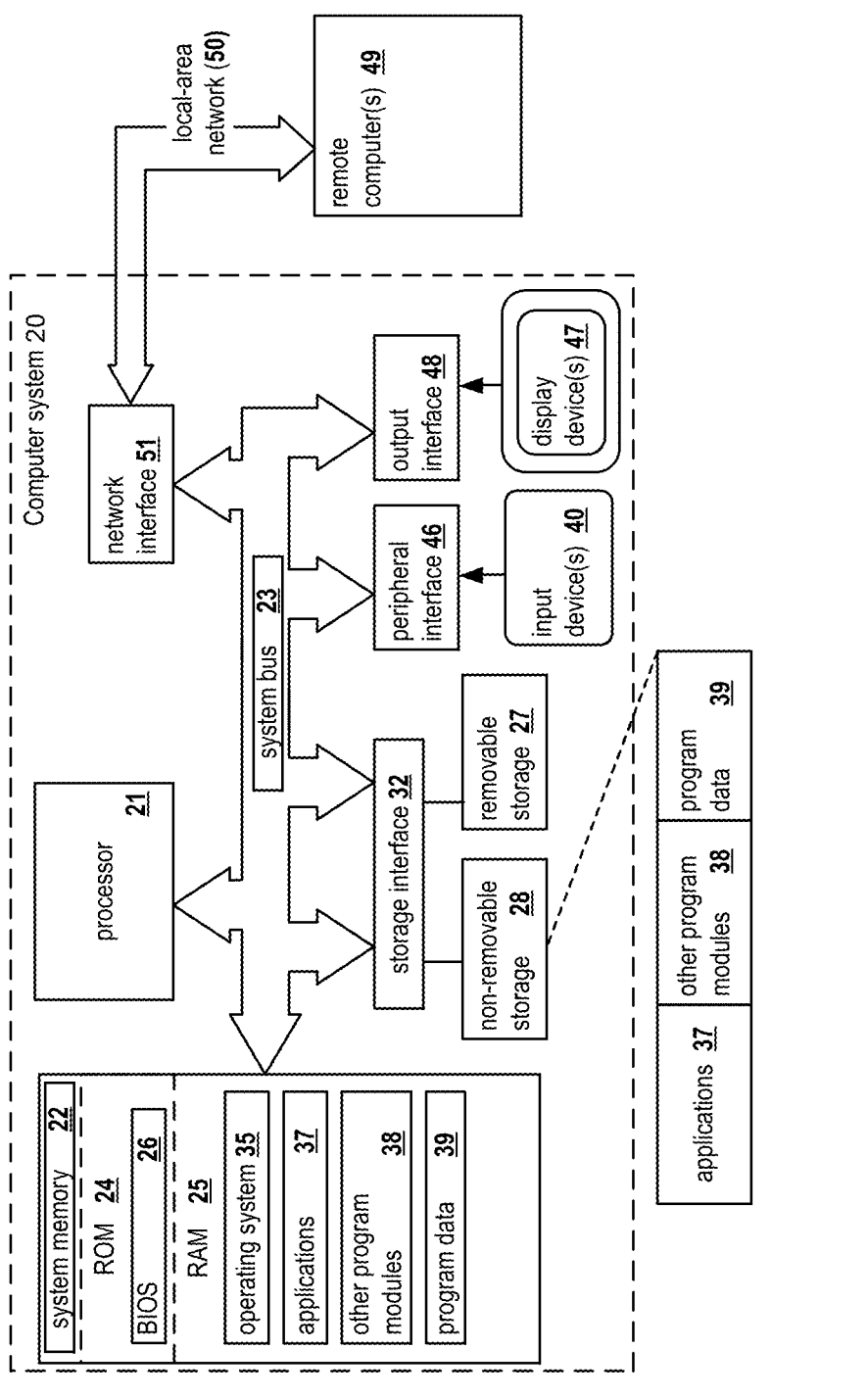
FIG. 5 shows an example of a computer system on which variant aspects of systems and methods disclosed herein may be implemented.

The security monitor 120 may be implemented with the ability to run on a computer processor running the OS 100 (an example of a general purpose computer 20 is shown in FIG. 5). The security monitor 120 may be configured to control the delivery of the messages 140 based on the decisions 150 taken on the basis of the security policies from the policy database 121. The control of the delivery of the message 140 may include allowing or prohibiting the delivery of the message 140 and, accordingly, allowing or prohibiting the execution of communication that uses the message 140. The decision 150 on the method of controlling the delivery of the message 140 may indicate the authorization or transmission of the message 140 in compliance with the security policy. The decision 150 may be used by the security monitor 120 or its components to implement the control of the delivery of message 140 (see FIG. 2). Based on the security policies from the policy database 121, the decision 150 may be issued using the data in the message 140 (for example, the name of the process to be launched or the actual arguments of the process method called).

Also, the decision 150 on the method of controlling the delivery of the message 140 may depend on the correctness of the structure of the message 140. Thus, if the message 140 has an invalid structure, the transmission of the message 140 may be prohibited. In this case, valid message structures can be defined using the declarative description of the interface of the process-receiver of the message 140. The above-mentioned structure may contain the size of the message 140, valid arguments and other valid parameters of the message 140.

In an aspect, the security monitor 120 may be part of the OS kernel 110 or a separate application. In another aspect, the security monitor 120 may run in the privileged mode of the OS kernel 110.

An aspect of the OS 100 additionally may include an audit service 133, designed to log the results of the delivery control of the messages 140. In this case, the control of the delivery of the message 140 may additionally include performing an audit using the audit service 133. In another aspect, the security monitor 120 may exercise control over the delivery of messages 140, additionally taking account of the current status of the audit service 133. This status indicates that the audit service 133 is ready to receive and store messages 140. For example, if the first process 131 sends a request 142 to a secure resource (via the second process 132) where the information about access to the secure resource should always be logged, but the status of the audit service 133 indicates that the audit service 133 is not currently storing messages 140, then such a request 142 may be prohibited by the security monitor 120 in accordance with the security policy.

In an aspect, the OS 100 may contain the security monitor context 122. The security monitor 120 may control the delivery of the messages 140 additionally taking account of the context 122. The security monitor context 122 may contain the values of the security policy parameters. In an aspect, the security monitor 120 may additionally be configured to change the context 122 to take account of the decisions 150 based on the security policies from the policy database 121. In an aspect, the security policies may use a finite state machine model, a mandatory integrity control model, or other models to implement the security policies. Details of these models will be disclosed later in the description of FIG. 3A. Depending on the models used by the security policies, the context 122 may contain different security policy parameters. For example, for security policies based on the mandatory integrity control model, the context 122 may contain values for integrity levels and access levels to the protected resources. For security policies based on a finite state machine, the context 122 may contain the current value of the state of the finite state machine and the transition table of the finite state machine.

FIG. 1B shows an example of the control of delivery of a permitted request 142 from the first process 131 to the second process 132 using the security monitor 120. The first process 131 may call an interface method of the second process 132, for which the first process 131 may send a request 142 containing the input arguments of the called method. The first process 131 may send the request 142 via the OS kernel 110. The OS kernel 110, in turn, may send the request 142 to the security monitor 120 for verification. The security monitor 120 may issue the decision 150 "permitted" based on the security policies from the policy database 121 and may transfer this decision 150 to the OS kernel 110. Then, the kernel 110 may forward the request 142 based on the decision 150 to the second process 132.

In the example illustrated in FIG. 1B, the second process 132 may then send a reply 143 (the reverse sequential order of the messages 140 is not indicated) to the first process 131, where the reply 143 may contain the output arguments of the called method. The method for sending the reply 143 may be the same as the method for sending the request 142, but in reverse order, from the second process 132 to the first process 131. That is, the second process 132 may send a reply 143 by means of the OS kernel 110. The kernel 110, in turn, may send a reply 143 to the security monitor 120 for verification. The security monitor 120 may issue a new decision 150 "permitted" based on security policies from the policy database 121 and may transfer this new decision 150 back to the OS kernel 110. Then, based on the new decision 150, the kernel 110 may forward the reply 143 to the first process 131.

FIG. 1C shows an example of the control of a prohibited request 142 from the first process 131 to the second process 132. In the illustrated example, the security monitor 120 may control the delivery of the request 142 by prohibiting the delivery of the request 142. The first process 131 may send the request 142 via the OS kernel 110. The OS kernel 110 may, in turn, send the request 142 to the security monitor 120 for verification. The security monitor 120 may issue the decision 150 "prohibited" based on the security policies from the policy database 121 and may transfer this decision 150 to the OS kernel 110. The kernel 110 may then send an error notification to the first process 131 based on the decision 150. In this case the request 142 will not be transferred to the second process 132.

Figure 2:
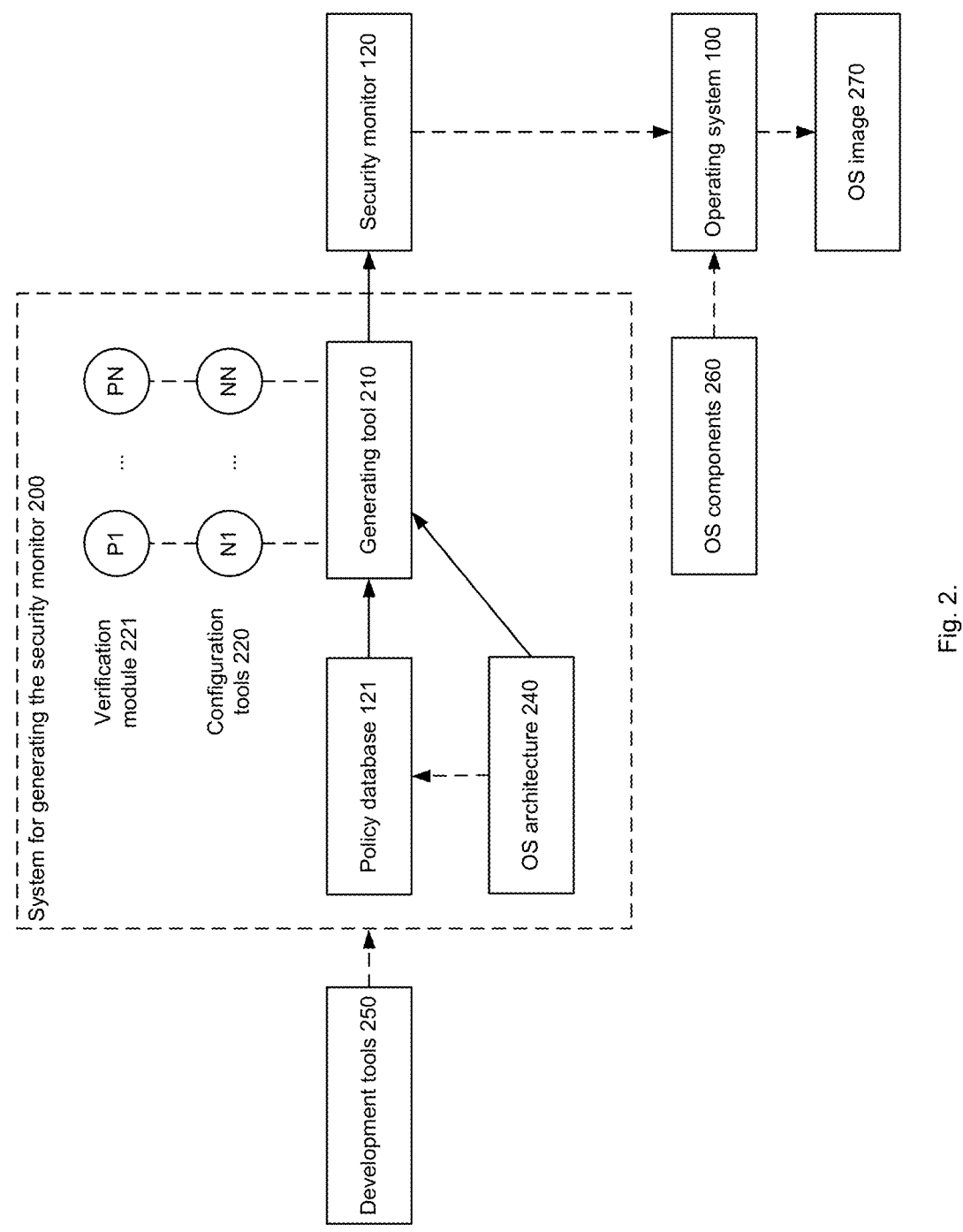
FIG. 2 is an example system diagram illustrating a security monitor.

FIG. 2 is an example system diagram illustrating a security monitor 200. The system for generating the security monitor 200 may be used to improve the security of the OS 100 when exchanging messages 140 and also to exercise control over the delivery of the messages 140 to the recipient. In this case, the security monitor 120 may be used by software developers in various operating systems 100 and/or any other computer systems in which exchange of messages 140 is used, including, but not limited to, in databases and application software. An example of this use was discussed earlier in conjunction with FIGS. 1A-1B. For each operating system 100 a security monitor 120 may be generated based on the features of the OS architecture 240 and by taking account of the security requirements for that operating system 100 as expressed in the security policies. It should be noted that for the various software and firmware development systems based on the OS 100 (hereafter referred to as the development system), the main objects of the OS architecture 240 may be shared. Examples of such objects may include, but are not limited to processes, services, applications, drivers that are responsible for operating the kernel 110 and other components of the operating system 260. At the same time, the other objects of the OS architecture 240 that are responsible for the functionality of the development system may be different for each of the systems mentioned. Therefore, there may need be different security policies that are used to control the delivery of messages 140. Development systems may include software as well as firmware systems.

The system 200 may contain the policy database 121 that may be configured to store the security policies required to control the delivery of messages 140. The system 200 may also contain at least one configuration tool 220 which may be designed to configure the corresponding verification module 221 based on the security policies received from the generating tool 210. The verification module 221 may be configured to generate a decision 150 on the method of controlling the delivery of the message 140 (hereafter, the decision) as requested by the security monitor 120 when implementing the security policy from the policy database 121. The system 200 may also contain a description of the OS architecture 240. The description of the OS architecture 240 may include, but is not limited to: OS architecture objects such as the processes and applications of the OS 100. In an aspect, the mentioned OS architecture objects may additionally include the objects of the development system based on the OS 100. In an aspect, the OS architecture objects may additionally include, but are not limited to:

a service-provision process that may include at least one software component that may be configured to implement the software interface of the given process; communication with the given process may be performed utilizing the aforementioned interface (for example, such a service may be an application that translates the flow of external events and requests for the event processing process);

a list of programming interfaces for each process; the corresponding interface methods that implement the functionality of the corresponding process may also be specified.

In an aspect, the OS architecture object may additionally be a resource driver—a process that manages resources and access to them. The resource may be, but is not limited to, a file, port, or process. For example, the file system is a resource driver, and the files themselves are resources to which the file system may provide access by other processes.

In addition, the system 200 may contain a generating tool 210 that may be configured to analyze the security policies. The analysis may include, but is not limited to, identifying the processes for which the given security policy is used. In an aspect, the aforementioned analysis may take into account the OS architecture objects 240, including the aforementioned processes and applications. The generating tool 210 may also be configured to select security policies from the policy database 121 for the corresponding configuration tools 220 and to transfer at least one selected security policy to the corresponding configuration tool 220. The generating tool 210 may also be configured to generate a security monitor 120 using the configured verification modules 221 obtained from each configuration tool 220, based on the results of the analysis. In an aspect, the generating tool 210 may generate the security monitor 120 by creating the code of the security monitor 120. The code mentioned may include, but is not limited to, source code, intermediate code, or executable code. In addition, the generation of the code of the security monitor 120 may also include code optimization and error analysis. Thus, the generating tool 210 may be the compiler that generates the code in question.

The OS architecture 240, the policy database 121 and the configuration tools 220 may be pre-configured using the development tool 250. For example, the development tool 250 may provide a set of APIs (application programming interfaces) or plug-in modules for software development. The term "interface", as used herein, refers to the process interface described earlier. In an aspect, at least part of the OS architecture 240, part of the security policies from the policy database 121, and part of the configuration tools 220 may be shared (based on templates) across different operating systems 100. In case of this sharing, the developer may configure the configuration tools 220 using the development tools 250, the OS architecture 240 and the security policies from the policy database 121. In an aspect, the developer may add to the template in question the security policies, OS architecture objects 240 and also the configuration tools 220 missing from the template, which may be needed to reflect the features of the OS 100 or the development system based on the OS 100, and the security requirements of the OS 100 or, respectively, the development system based on the OS 100 for which the given developer generates the security monitor 120. In addition, some of the data may be deleted from the template in question if it will not be needed in the OS 100 or in the OS development system 100, respectively. For example, some security policies and applications may be deleted.

The security monitor 120 may be generated, together with other components of the OS 260, and may also incorporated into the operating system 100. The above-mentioned incorporation of the security monitor 120 and the OS components 260 may be implemented using techniques known in the art. For example, the security monitor 120 and the OS components 260 may be incorporated during the compilation stage of the OS 100 using the OS 100 compiler or by installing the security monitor 120 on the OS 100. As mentioned earlier, the security monitor 120 may be part of the OS kernel 110 or a separate application of the OS 100. The security monitor 120 may run in a privileged mode on the OS kernel 110. For the OS 100, an OS installation image 270 may also be created to install the OS 100 on end-user computing devices. The OS installation image 270 may be, but is not limited to, an archive, an executable file, or an installation package. The installation package may be an archive file that includes the files of the OS 100, control files, and optionally, files for configuring the installation process of the OS 100. In addition, the installation package may include system developer files based on the OS 100. These files may be provided as source code, intermediate code, or in executable code.

The security policies from the policy database 121 may be defined using a specification language, such as PSL (policy specification language). In the PSL example, mandatory integrity control may be defined by the policy class Mandatory_integrity_control. The class (family) of security policies may define a set of rules that match the rules of the model used in the security policy. The security policy specification may determine the correspondence of these rules with communications in the system that may be implemented by exchanging messages 140 between processes. For each communication attempt, that is, each time the security monitor 120 verifies the messages 140, the security monitor 120 may apply the rules to generate a decision 150 as to the validity of the given communication (delivery of message 140). To use a policy class, a policy object may be created based on it, for which the configuration is specified.

Figure 3A:
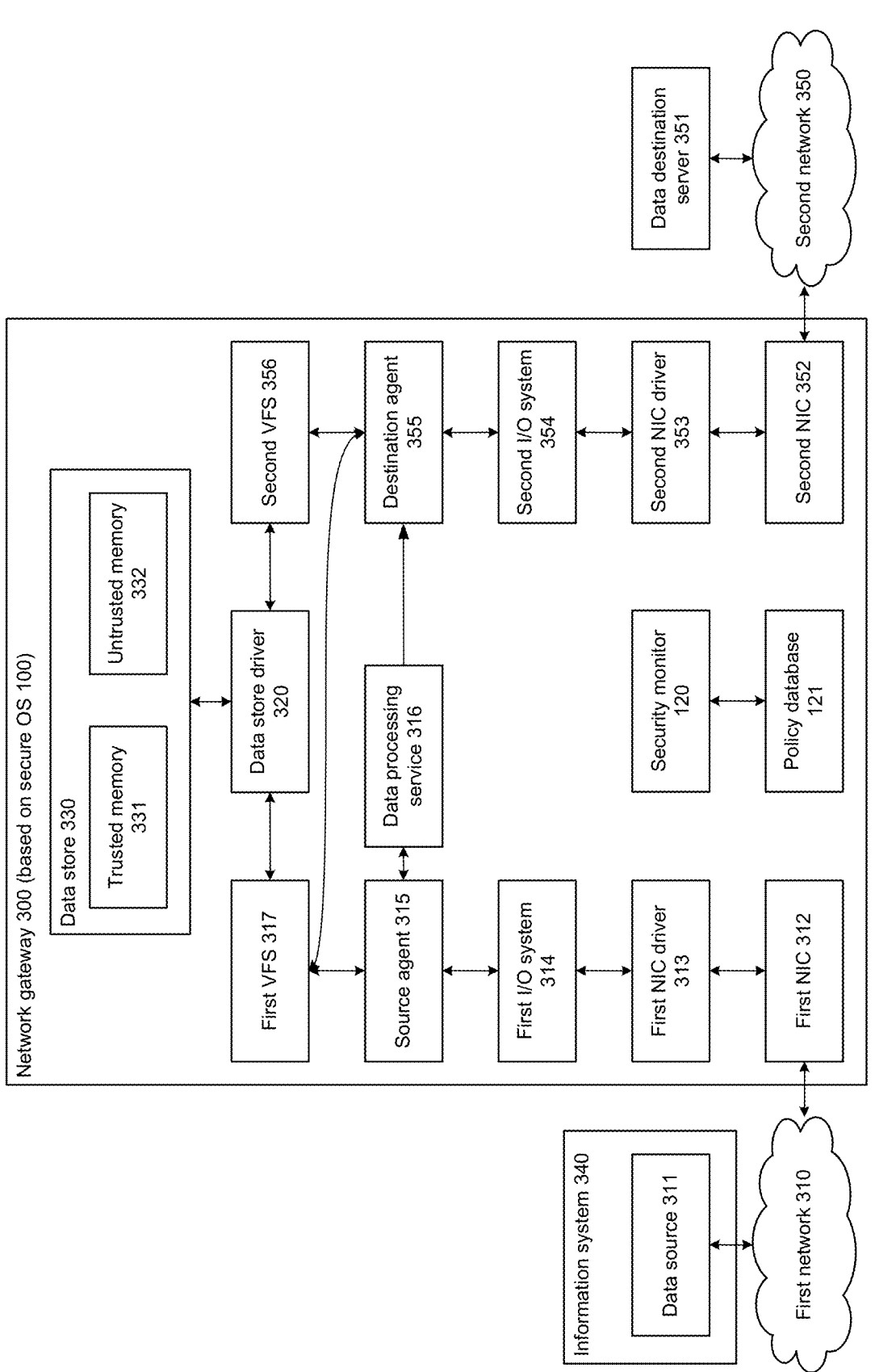
FIG. 3A shows an example system diagram illustrating a gateway for transferring data from the first network to the second network.

FIG. 3A shows an example system diagram illustrating a network gateway 300 for transferring data from the first network 310 to the second network 350. In an aspect, the gateway 300 may be implemented as a separate computer device or as a hardware router. In another aspect, the gateway 300 may be implemented as a virtual machine running on the processor of a general purpose computer 20. The operating system used in the gateway 300 may be the OS 100, an example of which is shown in FIGS. 1A-1B, and may include the security monitor 120 implemented with the ability to run on the processor of the gateway 300. The first network 310 may be an internal network of IS 340 based on the Internet of Things. The data source 311 may consist of devices of the IS 340 connected to the first network 310 and connected to the gateway 300, for transferring data to the data destination server 351 via the second network 350, to which the gateway 300 is also connected. The data destination server 351 may include, but is not limited to, for example, a remote server.

Since the gateway 300 is a computer device based on the OS 100, the security monitor 120 may be used to control communication with the gateway 300. In an aspect, the security monitor 120 may be implemented as a separate computer device, such as the general purpose computer 20 illustrated in FIG. 5. The security monitor 120 may be configured to control the communications between the software components of the gateway 300, which may be provided in the form of services, applications, and processes of the OS 100 installed on the gateway 300 and which may be implemented with the capability to run on the processor of the gateway 300. The components of the gateway 300 may include, but not limited to: a first Network Interface Card (NIC) driver 313, a first I/O system 314, a source agent 315, a data processing service 316, a first Virtual File System (VFS) 317, a data store driver 320, a second VFS 356, a destination agent 355, a second I/O system 354, and a second NIC driver 353. In an aspect, the data store driver 320 may be stored in the trusted memory 331 as well as the untrusted memory 332. In this case, the trusted memory 331 and the untrusted memory 332 may also be components of the gateway 300, which means they may contain the services, applications and process implemented with the ability to run on the processor of the gateway 300. At the same time, the trusted memory 331 and the untrusted memory 332 may reside on a machine-readable medium of the gateway 300 with data storage capability.

For each component of the gateway 300, security policies may be defined in the policy database 121, according to which the security monitor 120 may control each communication between the above-mentioned components of the gateway 300.

The gateway 300 may have at least two states, known as 'safe' and 'work'. The 'safe' state may indicate to the destination agent 355 to allow access to trusted memory 331 and to deny access to the second network 350 and to untrusted memory 332. The 'work' state may indicate that the destination agent 355 is denied access to the trusted memory 331, is permitted to access the second network 350 and the untrusted memory 332, and also permitted to transfer data from the source agent 315 to the destination agent 355 and to prohibit data transfer from the destination agent 355 to the source agent 315. Information about the current state of the gateway 300 may be stored in the security monitor 120, for example. In another aspect, information on the current state of the gateway 300 may be stored in the trusted memory 331 or in a separate, temporary or permanent data store of the gateway 300 (not shown in FIG. 3). Therefore, security policies may also depend on the state of the gateway 300. For example, a security policy may be specified under which the destination agent 355 may be permitted to access trusted memory 331 in the 'safe' state of the gateway 300. Another security policy may exist that denies the destination agent 355 access to the trusted memory 331 in the 'work' state of the gateway 300. More detailed information about security policies will be described below.

Since the gateway 300 uses the secure OS 100, the above-mentioned components of the gateway 300 may communicate between themselves using IPC. These components may also communicate with the OS kernel 110 by employing software interfaces through exchange of messages 140 (also IPC messages). The aforementioned interfaces may be implemented by processes, may be statically defined and the allowed communications between the processes may be defined in advance. Messages may be sent and received by processes 131-132 by means of system calls to the OS kernel 110. The security monitor 120 may be configured to control these communications by controlling the delivery of the messages 140 in question. More information about the secure OS 100 and the control of the IPC communications by the security monitor 120 was described earlier in conjunction with FIGS. 1A-1B.

According to an aspect, the security monitor 120 may be used to set the state of the gateway 300 to 'safe'. The 'safe' state may indicate to the destination agent 355 to authorize access to the trusted memory 331 and to deny access to the second network 350 and the untrusted memory 332. To implement these permissions and prohibitions, at least one security policy may be defined in the policy database 121, under which the destination agent 355 is permitted to access trusted memory 331 and denied access to the second network 350 and untrusted memory 332 in the 'safe' state of the gateway 300.

It should be noted that security policies may be defined in advance by the administrator of the gateway 300. In addition, security policies may be defined by the security monitor 120 in an operational process of the gateway 300.

The trusted memory 331 may contain data critical to the secure operation of the gateway 300 and the data source 311, such as authorization settings for data transfer to the second network 350 (including, but not limited to, logins, passwords, certificates, electronic/digital signatures required to authorize the data transfer process), software on the gateway 300, configuration files (settings) of the various components of the gateway 300, in particular settings of the destination agent 355, etc. The untrusted memory 332 may contain data that is not critical to the secure operation of the gateway 300 and the data source 311. Such non-critical data may include, but is not limited to, service information of the data destination server 351, service information of the destination agent 355, and a buffer for storing the data to be transferred. Service information may include authorization information for the data destination server 351 and for the applications and services installed on the above-mentioned data destination server 351. Such authorization data may include, for example, an access API token.

In the illustrated case, the destination agent 355 may be configured to establish communication with the data destination server 351, and also may be configured to transfer the data received from the source agent 315 to the data destination server 351 via the second network 350. One non-limiting example of the destination agent 355 may be a MindSphere® Agent if the data destination server 351 is a Siemens MindSphere-based cloud server.

The source agent 315 may be configured to receive the above-mentioned data from the first network 310 from the data source 311, for example, using the OPC UA (Unified Architecture) industrial communication protocol. OPC is the interoperability standard for the secure and reliable exchange of data in the industrial automation space and in other industries. In addition, the security monitor 120 may be configured to provide access to the trusted memory 331 on request from the destination agent 355, provided that security policies from the policy database 121 are implemented.

The destination agent 355 may be designed to be configured in the 'safe' state of the gateway 300 based on the destination agent 355 parameters from the trusted memory 331. This configuration may be performed by the destination agent 355 itself. In an aspect, the destination agent 355 may be configured by the security monitor 120. This configuration of the destination agent 355 may be performed at the time when the gateway 300 is in the 'safe' state in which the destination agent 355 is allowed access to the trusted memory 331 and is denied access to the second network 350 and the untrusted memory 332. At the same time, the destination agent 355 may be given access to the trusted memory 331 using the first VFS 317. The security monitor 120 may also change the state of the gateway 300 to the 'work' state after the destination agent 355 is configured. At the same time, the 'work' state of the gateway 300 may indicate to the destination agent 355 that it is denied access to the trusted memory 331, that it is allowed access to the second network 350 and to the untrusted memory 332, and that the transfer of data from the source agent 315 to the destination agent 355 is permitted and the transfer of data from the destination agent 355 to the source agent 315 is prohibited. To implement these permissions and prohibitions, a security policy may be set in the policy database 121 according to which in the 'work' state of the gateway 300 the destination agent 355 is denied access to the trusted memory 331 and allowed access to the second network 350 and the untrusted memory 332, while the source agent 315 is allowed to transfer data to the destination agent 355 and the destination agent 355 is not allowed to transfer data to the source agent 315. In this case, prior to configuration, the destination agent 355 may not have been provided with the above permissions and prohibitions.

In an aspect, the specified configuration of the destination agent 355 may include, but is not limited to, preparing an authorization request containing authorization parameters (including, but not limited to, logins, passwords, certificates, electronic digital signatures required to authorize the data transfer process) to the data destination server 351 on the second network 350. Accordingly, the result of the configuration of the destination agent 355 may include the above-mentioned authorization request. At the same time, after the status of the gateway 300 is changed to the 'work' state, the destination agent 355 may be used to send the prepared request to the data destination server 351 to authorize and establish a connection for the subsequent data transfer. In an aspect, the parameters of the destination agent 355 contained in the trusted memory 331 may additionally include a list of data to be transferred to the second network 350 from the first network 310. Such list may include, but is not limited to, for example, only data from specified devices of the data source 311, or data of a specified data type, etc. In this example, the destination agent's 355 configuration may optionally include the step of configuring a data filter for filtering (also processing) the data received from the source agent 315 according to the specified parameters. The configuration of the data filter may include, but is not limited, creating rules to filter the received data in accordance with the above-mentioned parameters of the destination agent 355 in order to subsequently transfer only filtered data to the second network 350. The data filter may also be part of the destination agent 355.

Data may be transferred from the first network 310 to the second network 350 using the source agent 315 and the destination agent 355 under the control of the security monitor 120. The security monitor 120 may implement the security policies from the policy database 121 based on the configuration of the destination agent 355. In this case, the destination agent 355 may use the untrusted memory 332 to perform the given data transfer. Untrusted memory 332 may include, but is not limited to, the service information of the recipient, that is, the data destination server 351.

In an aspect, the trusted memory 331 and the untrusted memory 332 may be two separate data stores (machine-readable media). In another aspect, the trusted memory 331 and the untrusted memory 332 may be two different partitions of the same data store 330, located in different address ranges of the data store 330. The data store 330 may include, but is not limited to, for example, a hard disk, flash memory, or other machine-readable data storage medium. In this case access to trusted memory 331 and untrusted memory 332 may be implemented as access to individual devices. Therefore, both of the above embodiments may be used in the gateway 300. For ease of illustration, a second aspect will be considered below, in which trusted memory 331 and untrusted memory 332 are two partitions of the same data store 330. The data store 330 and therefore the trusted memory 331 and untrusted memory 332 may be accessed using the data store driver 320. The data store driver 320 may be configured to perform I/O operations on the data store 300 under the control of the security monitor 120 and observing the security policies from the policy database 121.

However, the first VFS 317 may be configured to organize the access (read and write access to files) to trusted memory 331 in the gateway 300 and the second VFS 356 may be configured to organize the access to untrusted memory 332. Security policies may be defined that permit the listed communications and prohibit other communications. In other words, the first VFS 317 may be assigned a security policy that allows reference to only a first range of memory addresses of the data store 300 corresponding to the trusted memory 331. Similarly, the second VFS 356 may be assigned a security policy that allows reference to only the second range of memory addresses of the data store 300 corresponding to the untrusted memory 332. Thus, according to the security policies, the first VFS 317 may be allowed access to the trusted memory 331 and denied access to the untrusted memory 332. The second VFS 356 may also be allowed access to the untrusted memory 332 and denied access to the trusted memory 331.

The gateway 300 may also contain a first NIC 312, which may be configured to provide connectivity to the first network 310. The driver of the first NIC 313 may be configured to transmit and receive data from the devices of the first NIC 312, in particular from the data source 311. In an aspect, the source agent 315 may access the first NIC driver 313 via the first I/O system 314. Security policies may be defined that permit these communications and prohibit other communications. In particular, in the 'safe' and the 'work' state of the gateway 300, the first I/O system 314 may be allowed access to the first NIC driver 313 and the source agent 315, while the first NIC driver 313 may be allowed access to the first I/O system 314 and may also be allowed to receive data from the data source 311 on the first network 310 via the first NIC 312. However, unspecified communications may be prohibited.

To make a connection to the second network 350, the gateway 300 may contain a second NIC 352. The second NIC driver 353 may be configured to transmit and receive data from devices on the second network 350, in particular the data destination server 351. In an aspect, the destination agent 355 may be configured to access the second NIC driver 352 via the second I/O system 354. In this case, the security policies may be defined to allow the listed communications and prohibit other communications, in particular, but not limited to, the following:

in the 'safe' state of the gateway 300: there may be no allowed communications for the second I/O system 354 and the second NIC driver 353;

in the 'work' state of the gateway 300: the second I/O system 354 may be allowed access to the destination agent 355 and the second NIC driver 353, the second NIC driver 352 may be allowed access to the second I/O system 354, and data exchange may also be allowed with devices on the second network 350 (using the second NIC 352);

unspecified communications may be prohibited.

The first NIC 312 and the second NIC 352 may be any known in the art or later developed network cards (including, but not limited to, network board, network adapter, network interface controller). The first NIC 312 and the second NIC 352 may be devices for the communication between the gateway 300 and other devices of the first network 310 or the second network 350 respectively.

Examples of such network cards include, but not limited to, Ethernet adapters, Wi-Fi adapters, Bluetooth adapters, and others.

In an aspect, the source agent 315 may be communicatively coupled to the destination agent 355 using the data processing service 316. The data processing service 316 may be used to request and receive data from the source agent 315 and subsequent one-way data transfer to the destination agent 355. It should be noted that a security policy may be specified for the data processing service 316 in the policy database 121 that allows access to the destination agent 355 in the 'work' state of the gateway 300. At the same time, for the destination agent 355, a security policy may be specified that denies access to the data processing service 316 in the 'work' state of the gateway 300. This scheme may implement one-way data transfer in the 'work' state of the gateway 300. However, during the initialization process of the gateway 300, when the gateway 300 is in the 'safe' state, the destination agent 355 may be considered a trusted component of the gateway 300 and may be allowed access to the trusted memory 331.

According to an aspect described above, the parameters of the destination agent 355 contained in trusted memory 331 may include, but are not limited to, a list of data to be transferred to the second network 350 from the first network 310. According to another aspect, the data processing service 316 may be additionally configured to obtain the above-mentioned parameters of the destination agent 355 and then to configure the data filter for filtering (processing) the data received from the source agent 315 according to the given parameters. In this case, the data processing service 316 may obtain the above-mentioned parameters from the destination agent 355 in the 'safe' state of the gateway 300 or from the trusted memory 331 via the source agent 315. In both cases, in the policy database 121 security policies may be defined that permit these communications and prohibit other communications.

The configuration of the data filter may include, but is not limited to, creating rules for filtering the received data in accordance with the above-mentioned parameters of the destination agent 355 in order subsequently to transfer only filtered data to the second network 350. The data filter may be part of the data processing service 316.

The data processing service 316 may be configured to transmit already filtered data to the destination agent 355 in the 'work' state of the gateway 300. This scheme enables one-way data transfer from the source agent 315 to the destination agent 355 using the data processing service 316 in the 'work' state of the gateway 300. In addition, in the event of an attacker potentially compromising the destination agent 355, the attacker would only gain access to the filtered data, but not to the original data received by the source agent 315. At the same time, an attacker could still access the filtered data by compromising the second network 350 or the data destination server 351. Therefore, this aspect further enhances the data security of the first network 310.

Description of Security Policies

In a particular aspect, the security policies may use at least one of the following models: basic operations; finite state machine; timed automaton; role-based access control; mandatory integrity control; regular expressions; Discrete Event Systems (DES); object capability model; temporal logic.

The security policies from the policy database 121 may be defined using a specification language, such as, but not limited to, PSL (Policy Specification Language) and extensible Access Control Markup Language ("XACML"). In the PSL example, the finite state machine may be defined by the policy class finite_state_machine. The class (family) of security policies may define a set of rules that match the rules of the model used in the security policy. The security policy specification may determine the correspondence of this set of rules with communications in the OS 100 that can be implemented through exchange of messages 140 between processes corresponding to the components of the gateway 300. For each communication attempt, that is, each time the security monitor 120 verifies the messages 140, the security monitor 120 may apply at least one of the rules to generate a decision as to the validity of the given communication (delivery of message 140). To use a policy class, a policy object may be created based on the policy class by the security monitor 120, for which the configuration is specified.

In an aspect, the analysis of the security policy and objects of the OS architecture 240 may include, but is not limited to, at least one of the following types of analysis: lexical analysis, syntactic analysis, semantic analysis. The security policy analysis may identify objects of the OS architecture 240, in particular the processes involved in the exchange of messages 140, for which the specified security policy may be applied. In other words, the security monitor 120 may determine a correspondence between the identified objects in the OS architecture 240 and the security policy applied to the specified objects. For example, if a security policy allows a request 142 from the first process 131 to the second process 132, an analysis of that security policy may identify specific processes 131-132 and the information about the allowed request 142. It should be noted that as a result of this security policy analysis, other objects of the OS architecture 240 may be further identified that are validated in the specified security policy. For example, the security monitor 120 may identify process interface methods, when the message 140 is addressed to the specified method and will be passed to the specified process interface. In this case, the security policy may verify the requirement that when messages 140 are exchanged between the identified processes, the defined process interfaces and defined interface methods are used.

In the example of the PSL language, which can be used to define security policies in the policy database 121, a reference to the first process 131, which is the source of the request 142, may be contained in the variable "scr". A reference to the second process 132, which is the destination of the request 142, may be contained in the variable "dst". Accordingly, it is the aforementioned analysis of the security policy from the policy database 121, written in the PSL language, that may allow identification of the specified OS architecture objects for which the specified security policy may be applied.

In another aspect, the analysis of the security policy from the policy database 121 may also include checking the types of the objects of the OS architecture 240, as well as an analysis for errors in the security policies from the policy database 121.

The results of the above analysis may be taken into account in generating the security monitor 120. For example, the security monitor 120 may record the security policy application conditions—a list of objects of the OS architecture 240. The list of objects may include, for example, processes, and security policies corresponding to this list, as well as validation modules 221. Therefore, when a message 140 is received from the OS kernel 110, the generated security monitor 120 may identify the objects of the OS architecture 240 participating in the exchange of messages 140 and then may determine the security policies that are applied to the specified objects of the OS architecture 240. The security monitor 120 may then send the messages 140 corresponding to the specified security policies to the verification modules 221, to decide how to control the delivery of the message 140.

In an aspect, a syntactic analysis may be performed by constructing a syntactic tree for the code of the security monitor 120. The syntax tree may include the code of the verification modules 221 generated by the at least one configuration tool 220.

Security policies may use basic operations that allow or deny transfer of the message 140 on the condition that the parameters of the message 140 (for example, the name of the process to be launched or the actual arguments of the method to be called) match the data specified in the security policy. For example, a security policy might determine that the first process 131 may receive any messages, but that the first process 131 is not allowed to send messages.

In an aspect of the security policy a finite state machine may be used, where the state of the finite state machine may be the state of the gateway 300. The security policy may determine whether to allow or deny access from one gateway 300 component to another gateway 300 component depending on the state of the finite state machine and according to the state transition table of the finite state machine.

The following is a description of the exemplary secure_gateway finite state machine:

```
policy object secure_gateway = finite_state_machine {
    states : [Safe, Work],
    initial : Safe,
    transitions : {
        Safe : [Work],
        Work : [Work],
    }
}
```

The secure_gateway finite state machine may be in one of the following states: 'safe' (secure state), 'work' (operational state). The states of the secure_gateway finite state machine may correspond to the states of the gateway 300. The transition table of the finite state machine may be represented in the 'transitions' structure. When the secure gateway finite state machine is initialized it may be in the 'safe' state. The 'safe' state may indicate that the destination agent 355 is allowed access to the trusted memory 331 and that it is denied access to the second network 350 and to the untrusted memory 332. From the 'safe' state, the finite state machine may only transition to the 'work' state. The 'work' state may indicate to the destination agent 355 that it is denied access to the trusted memory 331 and that it is permitted to access the second network 350 and the untrusted memory 332. The 'work' state may also indicate that data transfer from the source agent 315 to the destination agent 355 is permitted and that the transfer of data from the destination agent 355 to the source agent 315 is prohibited.

In this case, from the 'work' state, the secure_gateway finite state machine may only transfer to the same 'work' state and may not return to the 'safe' state.

The following are examples of security policies in the policy database 121 for the destination agent 355 (Agent_dst) that may use the secure_gateway finite state machine.

```
request src=Agent_dst,
    dst=Safe_storage,
    method=Read {
        secure_gateway.allow [Safe];
    }
```

According to the security policy described above, the destination agent 355 may be allowed access (Read method) to the trusted memory 331 (Safe_storage) provided that the secure_gateway finite state machine is in the 'safe' state.

```
request src=Agent_dst,
    dst=IO_ext,
    method=Access {
        secure_gateway.deny [Safe];
    }
```

This security policy may prohibit the destination agent 355 (Agent_dst) from accessing ('Access' method) the second network 350, for example by means of the second I/O system 354 (IO_ext), provided that the secure_gateway finite state machine is in the 'safe' state.

```
request src=Agent_dst,
    dst=Unsafe_storage,
    method=Read {
        secure_gateway.deny [Safe];
    }
    method=Write {
        secure_gateway.deny [Safe];
    }
```

According to the security policy described above, the destination agent 355 may be denied access ('Read' and 'Write' methods) to the untrusted memory 332 (Unsafe_storage) provided that the secure_gateway finite state machine is in the 'safe' state.

```
security src=Secure_monitor, method=Confirm {
    secure_gateway.enter [Work];
}
```

According to this security policy, the security monitor 120 may be allowed to implement a security request 144 to change the state (method 'confirm') of the secure_gateway finite state machine to 'work'. In this case, the change in the state of the finite state machine may also be performed by the security monitor 120 if the specified change in the state of the finite state machine is compatible with the transition table of the finite state machine.

```
request src=Agent_dst,
    dst=Unsafe_storage,
    method=Read {
        secure_gateway.allow [Work];
    }
    method=Write {
        secure_gateway.allow [Work];
    }
```

According to this security policy, the destination agent 355 is allowed access (methods 'Read' and 'Write') to the untrusted memory 332 provided that the secure_gateway finite state machine is in the 'work' state.

```
request src=Agent_dst,
    dst=Safe_storage,
    method=Read {
        secure_gateway.deny [Work];
    }
    method=Write {
        secure_gateway.deny [Work];
    }
```

According to this security policy, the destination agent 355 is denied access ('Read' and 'Write' methods) to the trusted memory 331 provided that the secure_gateway finite state machine is in the 'work' state. It should be noted that this security policy may be optional (that is, not present in the policy database 121) if the security monitor 120 applies the security policies according to the 'default deny' model. In this case, if the policy database 121 does not have a security policy allowing the destination agent 355 access to the trusted memory 331 when the finite state machine is in the 'work' state, that access will be denied by default.

```
request src=Agent_dst,
    dst=Agent_src,
    method=Receive {
        secure_gateway.allow [Work];
    }
    method=Transfer {
        secure_gateway.deny [Work];
    }
```

According to this security policy, the destination agent 355 is allowed to receive data (method Receive) from the source agent 315 (Agent_src) and is not allowed to transfer data (method Transfer) to the source agent 315, provided that the secure_gateway finite state machine is in the 'work' state.

```
request src=Agent_dst,
    dst=IO_ext,
    method=Access {
        secure_gateway.allow [Work];
    }
```

This security policy allows the destination agent 355 to access (method Access) the second network 350, for example, by means of the second I/O system 354, provided that the secure_gateway finite state machine is in the 'work' state.

In another aspect of the security policy, the timed automata model may be used. For example, the security monitor 120 may use ERA type (event-recording automata) timed automata. ERA automata is a special case of a finite state machine. In this model, an additional time parameter (timer) may be set for each message, equal to the time since the last receipt of this message. For example, a transition from one finite state machine state to another state may occur if the message was received after the time defined by the timer.

The Mandatory Integrity Control model may be used to permit or deny the delivery of a message 140. According to the mandatory integrity control model, using the security monitor 120 the objects of the OS architecture 240 involved in the transmission of the message 140 (for example, the processes 131-132) may be mapped to two numbers called the integrity level and the access level. In the process, security policies based on mandatory integrity control may be used to permit the delivery of a message from one object to another based on the values of the integrity levels and the access levels of the objects. For example, a security policy may be used that allows one object to access another object if the value of the access level of the first object is not less than the integrity level of the other. In the PSL specification language, integrity levels and access levels may be defined for the mandatory integrity control model. Thus, to set the integrity levels, an 'integrity' policy object may be defined as an instance of the Mandatory_integrity_control class:

```
policy object integrity =
    Mandatory_integrity_control {
        Config {
            levels : ["LOW", "MEDIUM", "HIGH"]
        }
    }
```

The integrity policy object configuration may define three levels of integrity: LOW, MEDIUM, and HIGH, in ascending order. In other words, LOW<MEDIUM<HIGH.

Policies based on object capability model may be based on the principle of minimum privileges. This principle of organization of access to resources implies that only privileges that are absolutely necessary for the successful completion of a task are provided to the subject (process or user). For example, a user who wants to find out the contents of a file should only be granted read permission for that file and only for the duration of the use of that file.

In an aspect, the security policies may use a temporal logic. To define security policies based on temporal logic, security properties (requirements) may be formulated based on a temporal logic formula and using temporal operators. Using the security monitor 120, the components of the gateway 300 may be mapped to their state events from a predefined set of events. For the gateway 300, the set of events may include, but is not limited to, the following: {read_safe, data_transfer}, where read_safe is the event of the destination agent 355 accessing trusted memory 331, data_transfer is the event of data transfer from the first network 310 to the second network 350 via the source agent 315 to the destination agent 355. A security property may be formulated, for example, as follows:

Property 1. Whenever a destination agent 355 gains access to trusted memory 331 in the 'safe' state of the gateway 300, it should be ensured that after a transition of the gateway 300 to the 'work' state, the destination agent 355 should not be able to read data from trusted memory 331. It should also be ensured that the destination agent 355 may access the untrusted memory 332 and the external network 350 only if the destination agent 355 has previously accessed the trusted memory 331, (i.e., a read_safe event occurred). In addition, when a read_safe event occurs, permission to transfer data from the source agent 315 to the destination agent 355 may be guaranteed and the transfer of data from the destination agent 355 to the source agent 315 may be prohibited. The specified property can be written as the formula:

$G(data\_transfer \Rightarrow P\ read\_safe)$, where G is the temporal operator "always in the future", P is the temporal operator "at least once in the past".

The construction of a policy class object that implements access control based on temporal logic may be implemented in the PSL language as the following structure:

```
policy object tl_checker = TL {
    config "G (data_transfer => P read_safe)"
}
```

It should be noted that other formulations of property 1 may be possible. For example, property 1 can be defined as follows: no data transfer occurs until the destination agent 355 has access to trusted memory 331 (that is, until the state of the gateway 300 is transferred from 'safe' to 'work'):

! data_transfer U read_safe, where U is the temporal operator "until such time as the specified event occurs".

A policy based on a temporal logic model when transferring data from the first network 310 to the second network 350 may associate a data_transfer event with this inter-process communication and may verify the truth of the formula specified in the policy object configuration. If the formula is true, the policy may allow the communication, and if false the policy may prohibit it.

Policies based on a discrete event model may be defined using the verification module 221 corresponding to the policies. These security policies may also be described in the PSL specification language. These security policies may be applied to development systems that contain a large number of components. For the system mentioned above, the model with discrete events may be a resultant finite state machine which is defined by a combination of a set of finite state machines. Each of the finite state machines may describe a separate component of the system. For each finite state machine, the set of its states and transitions between them may be indicated when certain events occur. The state of the resultant finite state machine may be determined by a combination of the states of the finite state machines of the system components. In this case, the specified combination may be implemented, for example, by a synchronous or asynchronous production of finite state machines. For the resultant finite state machine, a list of allowed transitions, a list of allowed states, and a list of prohibited states of the resulting finite state machine may also specified. Accordingly, the security policies may be used to verify the transition of the finite state machines of the system components and the resulting finite state machine into the initial state defined in the configuration (the configuration may include, but is not limited to, a set of states and transitions) of the corresponding finite state machine, the transition between states on the occurrence of a specific event, the occupation of one of the specified states by the corresponding finite state machine.

Figure 3B:
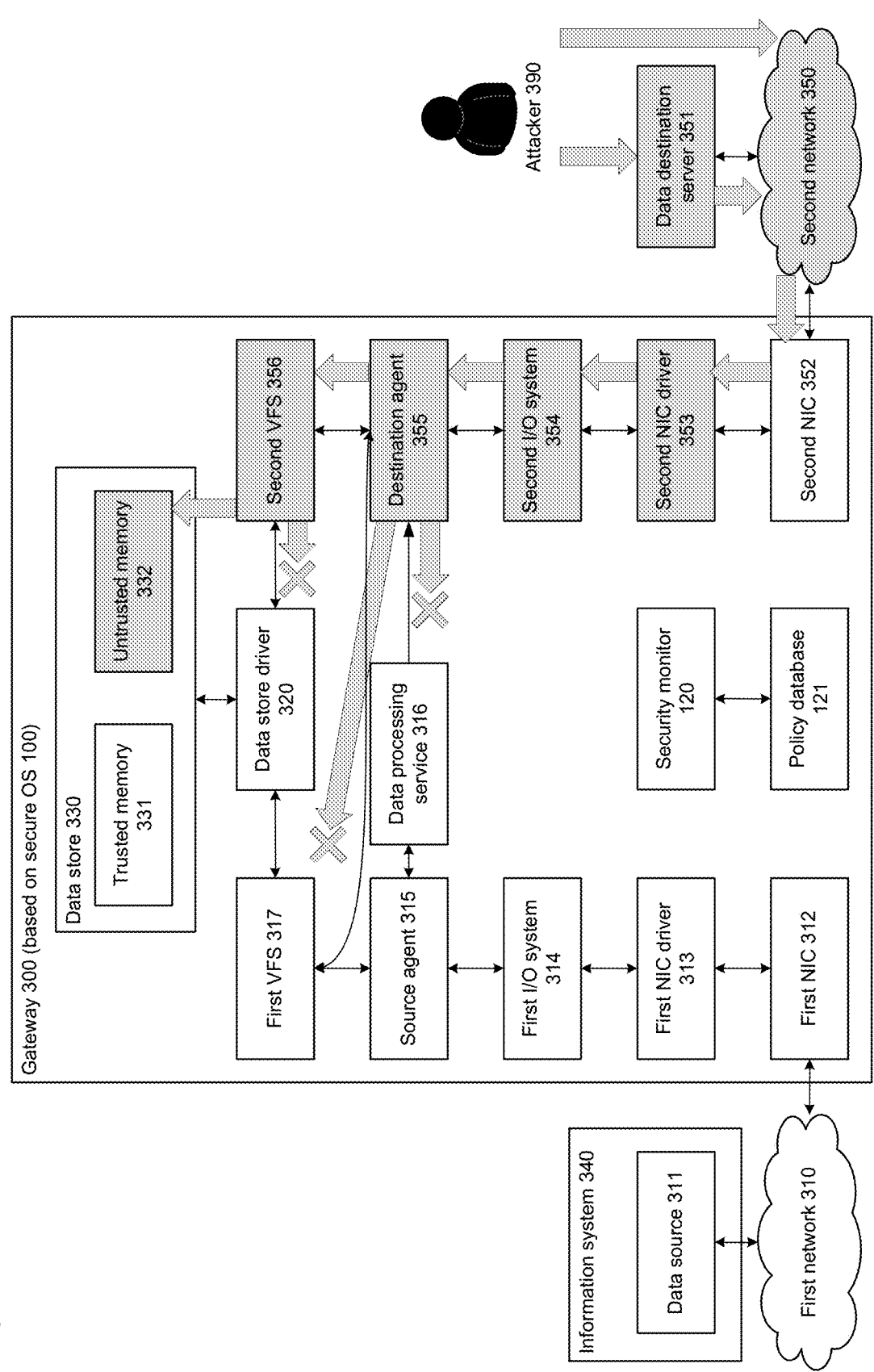
FIG. 3B shows the system diagram of gateway of FIG. 3A, where the possible types of computer attacks by an attacker from the second network on the components of the gateway and on the first network are indicated.

FIG. 3B shows the system diagram of gateway of FIG. 3A, where the possible types of computer attacks by an attacker 390 from the second network 350 on the components of the gateway 300 and on the first network 310 are indicated. For example, a gray fill indicates tools and modules that may be attacked and compromised by an attacker 390. Gray arrows indicate the attack vectors of the attacker, while the cross indicates attack vectors that will not be possible when using the gateway 300 disclosed herein.

An attacker 390 may attack the destination server 351 or the second network 350 directly. The attacker 390 may then attack NIC driver 353 and the second I/O system 354, which handle all network requests from the second network 350. The attacker 390 may exploit various vulnerabilities in these components, perform DDOS attacks, perform unauthorized access, and the like. It should be noted that by distinguishing the components of the gateway 300 related to the first network 310 and the second network 350, it may also be possible to use the security policies for each gateway 300 component to improve the overall security of the gateway 300. In an aspect, security policies may be used for the second NIC driver 353 that restrict the second NIC driver 353 from accessing devices on the second network 350. For example, the security policies may allow only access to the destination server 351. Even if the specified second NIC driver 353 is compromised, the security monitor 120, based on the security policies in the policy database 121, may not allow the second NIC driver 353 to gain access to other devices in the second network 350.

Thus, after gaining access to the second I/O system 354, the attacker 390 may continue the cyber-attack on the destination agent 355. However, the attacker 390 may not be able to mount an attack on either the data processing service 316 or the source agent 315, or on the first VFS 317 and the trusted memory 331. The attacker 390 may not be able to mount an attack because the gateway 300 may be in the work state where the destination agent 355 is denied access to the source agent 315 and the trusted memory 331. It should be noted that when the gateway 300 is just starting up and in the 'safe' state, the destination agent 355 may be deemed to be trusted and may be denied access to the second network 350. Therefore, in the 'safe' state of the gateway 300, the attacker 390 may not be able to compromise the destination agent 355 and mount a cyber-attack on other components of the gateway 300.

At the same time, in the 'work' state of the gateway 300, an attacker 390, having compromised the destination agent 355, may be able to mount an attack on the second VFS 356 and on the untrusted memory 332. However, the attacker 390 may not be able to compromise the data store driver 320 and therefore may not be able to gain access to the trusted memory 331. The data store driver 320 may be protected by the fact that the particular driver is deemed to be a trusted component of the gateway 300 because of the limited functionality of the data store driver 320, and so it can be verified to eliminate bugs and vulnerabilities. However, in an aspect, the gateway 300 may contain two data store drivers, one of which may provide access for the first VFS 317 to the trusted memory, and the second driver may provide access by the second VFS 356 to the untrusted memory 332.

With respect to possible attacks by an attacker 390 directly on the gateway 300 and on the first network 310, such attacks may be prevented by the architecture of the gateway 300. The data source 311 may be associated with the source 315 via a data transfer protocol that may allow data authorization (for example, OPC UA). Therefore, it may not be possible to transfer data from an unauthorized data source other than the data source 311. In addition, if the gateway 300 is located within the secure perimeter of an industrial information system, this eliminates the possibility of a physical attack (for example, connecting unauthorized devices, such as a flash card, to the gateway 300) on the components of the gateway 300.

Thus, aspects of the present disclosure may solve the stated technical problem, which is the low level of protection of the first network against cyber-attacks from the second network. In addition, aspects of the present disclosure allow the stated technical results to be achieved. The technical results may include implementing a unidirectional data transfer from the first network 310 to the second network 350, increased protection of the first network 310 from cyber-attacks from the second network 350, and increased protection for the gateway from cyber-attacks from the second network 350.

Figure 4:
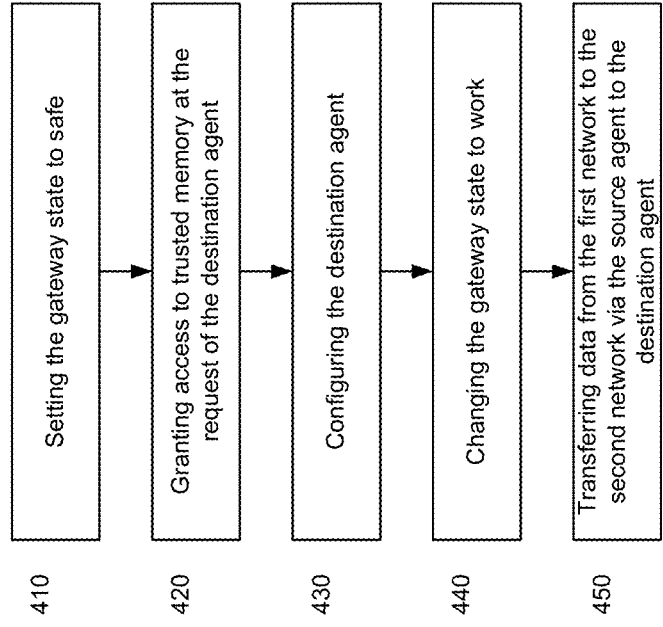
FIG. 4 is an example of a flowchart illustrating a method for transferring data from the first network to the second network.

FIG. 4 is an example of a flowchart illustrating a method for transferring data from the first network to the second network.

In step 410, the security monitor 120 may be used to set the state of the gateway 300 to 'safe'. In step 420, the security monitor 120 may provide access to the trusted memory 331 upon request from the destination agent 355. In an aspect, the requirement for implementation of security policies from the policy database 121 may be checked. Next, in step 430, the security monitor 120 or destination agent 355 may be used to configure the destination agent 355 based on the parameters of the destination agent 355 from the trusted memory 331, in particular the authorization parameters for data transfer to the second network 350. After configuring the destination agent 355, in step 440, the security monitor 120 may change the state of the gateway 300 to 'work'.

As a result, in step 450, data from the first network 310 is transferred from the data source 311 into the second network 350 to the data destination server 351 via the source agent 315 to the destination agent 355. This data transfer may be controlled by the security monitor 120 when the security policies from the policy database 121 are implemented and the results of the configuration of the destination agent 355 taken into account. In this case, the destination agent 355 may use the untrusted memory 332 to perform the above-mentioned data transfer. The untrusted memory 332 may include the service information of the destination agent 355. It should be noted that the particular aspects described earlier for the gateway 300 in FIG. 3A also apply to the method for transferring data from the first network 310 to the second network 350, illustrated in FIG. 4.

FIG. 5 shows an example of a computer system on which variant aspects of systems and methods disclosed herein may be implemented. The computer system 20 may represent the security monitor 120 of FIG. 1A and can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I2C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for transferring data from a first network to a second network using a gateway, comprising:
   setting a first state of the gateway, wherein in the first state a destination agent of the gateway is granted access to a first memory and denied access to the second network;
   while the gateway is in the first state, configuring the destination agent, based on one or more parameters stored in the first memory, to transfer data received from a source agent of the gateway to the second network;
   changing the state of the gateway to a second state, wherein in the second state the destination agent is denied access to the first memory and granted access to the second network; and
   while the gateway is in the second state, controlling transfer of the data from the source agent of the first network to the destination agent of the second network.

2. The method of claim 1, wherein the first memory comprises a trusted memory for storing data critical to secure operation of the gateway.

3. The method of claim 1, wherein, in the second state, data transfer from the source agent to the destination agent is permitted.

4. The method of claim 1, wherein the data transfer is performed based on the one or more parameters of the destination agent stored in the first memory.

5. The method of claim 1, wherein changing the state of the gateway to the second state further comprises changing the state of the gateway to the second state after configuration of the destination agent is complete.

6. The method of claim 1, wherein the one or more parameters include one or more transmission authorization parameters.

7. The method of claim 1, wherein the one or more parameters including a list of data to be transferred from the first network.

8. The method of claim 1, wherein in the first state, the access is denied to the second memory, and in the second state the access is granted to the second memory.

9. The method of claim 8, wherein the second memory comprises untrusted memory contains a buffer for storing the data to be transferred and destination agent information.

10. The method of claim 1, wherein controlling transfer of the data further comprises controlling communications between one or more resources according to one or more security policies, wherein the one or more resources comprise the destination, the source agent, and the first memory.

11. The method of claim 10, wherein the one or more security policies employ a finite state machine, where a state of the finite state machine represents a state of the gateway, and wherein the one or more security policies determine whether to allow or deny access from one gateway component to another gateway component depending on the state of the finite state machine.

12. A system for transferring data from a first network to a second network using a gateway, comprising:

at least one memory;

at least one hardware processor coupled with the at least one memory and configured, individually or in combination, to:

set a first state of the gateway, wherein in the first state a destination agent of the gateway is granted access to a first memory and denied access to the second network;

while the gateway is in the first state, configure the destination agent, based on one or more parameters stored in the first memory, to transfer data received from a source agent of the gateway to the second network;

change the state of the gateway to a second state, wherein in the second state the destination agent is denied access to the first memory and granted access to the second network; and while the gateway is in the second state, control transfer of the data from the source agent of the first network to the destination agent of the second network.

13. The system of claim 12, wherein the first memory comprises a trusted memory for storing data critical to secure operation of the gateway.

14. The system of claim 12, wherein in the second state data transfer from the source agent to the destination agent is permitted.

15. The system of claim 12, wherein the data transfer is performed based on the one or more parameters of the destination agent stored in the first memory.

16. The system of claim 12, wherein in the first state, the access is denied to the second memory, and in the second state the access is granted to the second memory.

17. The system of claim 16, wherein the second memory comprises untrusted memory contains a buffer for storing the data to be transferred and destination agent information.

18. A non-transitory computer readable medium storing computer executable instructions for transferring data from a first network to a second network using a gateway, including instructions for:

setting a first state of the gateway, wherein in the first state a destination agent of the gateway is granted access to a first memory and denied access to the second network;

while the gateway is in the first state, configuring the destination agent, based on one or more parameters stored in the first memory, to transfer data received from a source agent of the gateway to the second network;

changing the state of the gateway to a second state, wherein in the second state the destination agent is denied access to the first memory and granted access to the second network; and while the gateway is in the second state, controlling transfer of the data from the source agent of the first network to the destination agent of the second network.

19. The non-transitory computer readable medium of claim 18, wherein the first memory comprises a trusted memory for storing data critical to secure operation of the gateway.

20. The non-transitory computer readable medium of claim 18, wherein in the second state data transfer from the source agent to the destination agent is permitted.

* * * * *